United States Patent
Kim et al.

(10) Patent No.: US 9,196,919 B2
(45) Date of Patent: Nov. 24, 2015

(54) SECONDARY BATTERY AND MANUFACTURING METHOD OF THE SAME

(75) Inventors: Ha-Dong Kim, Suwon-si (KR); Joung-Hwan Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 624 days.

(21) Appl. No.: 12/837,769

(22) Filed: Jul. 16, 2010

(65) Prior Publication Data

US 2011/0081571 A1    Apr. 7, 2011

(30) Foreign Application Priority Data

Oct. 6, 2009    (KR) .................. 10-2009-0094564

(51) Int. Cl.
*H01M 2/08*    (2006.01)
*H01M 10/04*    (2006.01)

(52) U.S. Cl.
CPC ........ *H01M 10/049* (2013.01); *Y10T 29/49108* (2015.01)

(58) Field of Classification Search
CPC . H01M 2/0275; H01M 10/0431; H01M 2/08; H01M 2/0217
USPC .......... 429/164, 163, 177, 180, 129; 29/623.1
See application file for complete search history.

(56) References Cited

U.S. PATENT DOCUMENTS 7,618,737 B2 * 11/2009 Lee ................................. 429/66
8,283,064 B2 * 10/2012 Kim et al. ....................... 429/94
8,551,646 B2 * 10/2013 Choi .............................. 429/178

2003/0113616 A1 * 6/2003 Kasuga et al. ................ 429/94
2007/0224494 A1 * 9/2007 Kim ............................. 429/142
2008/0070100 A1 * 3/2008 Jang et al. ...................... 429/65

FOREIGN PATENT DOCUMENTS

| JP | 2002-025514 | | 1/2002 | |
|---|---|---|---|---|
| JP | 2009-026655 | | 2/2009 | |
| KR | 10-2003-0037565 | | 5/2003 | |
| KR | 10-2004-0053494 | | 6/2004 | |
| KR | 1020020080053 | * | 6/2004 | ............ H01M 10/38 |
| KR | 1020040053494 | * | 6/2004 | ............ H01M 10/38 |
| KR | 10-2008-0025436 | | 3/2008 | |
| KR | 10-2008-0030700 | | 4/2008 | |
| KR | 1020080030700 | * | 4/2008 | .............. H01M 2/14 |

OTHER PUBLICATIONS

Korean Office action dated Jun. 30, 2011 issued to priority application No. 10-2009-0094564, 1 page.

* cited by examiner

*Primary Examiner* — Patrick Ryan
*Assistant Examiner* — Angela Martin
(74) *Attorney, Agent, or Firm* — Christie, Parker & Hale, LLP

(57) ABSTRACT

A secondary battery, including an electrode assembly having a positive sheet and a negative sheet and a separator is interposed therebetween; a tape to wrap an outer surface of the electrode assembly; and a case to receive the electrode assembly. After a remainder of the tape is formed to extend beyond a lower surface of the electrode assembly and joined by a press, the remainder is positioned between a bottom surface of the case and the lower surface of the electrode assembly. According to the embodiment of the present invention, since a junction portion of the tape extended to the outside of the lower surface of the electrode assembly is bent and inserted into the case, a shock-absorbing action is provided to reduce an external shock applied to the secondary battery. Further, an additional tape process can be omitted to simplify a manufacturing process of the secondary battery.

20 Claims, 6 Drawing Sheets

SECONDARY BATTERY AND MANUFACTURING METHOD OF THE SAME

CROSS-REFERENCE TO RELATED APPLICATIONS

This application claims the benefit of Korean Application No. 10-2009-0094564, filed Oct. 6, 2009, in the Korean Intellectual Property Office, the disclosure of which is incorporated herein by reference.

BACKGROUND

1. Field

Aspects of the present invention relate to a secondary battery and a manufacturing method of the same, and more particularly, to a secondary battery and a manufacturing method of the same to form a remainder of an extended tape and compressing the remainder by a press outside a lower surface of the electrode assembly.

2. Description of the Related Art

Generally, a primary battery is not rechargeable, while a secondary battery is a rechargeable battery and is used in various portable electronic devices, such as a mobile phone, a notebook computer, and a camcorder. Examples of the secondary batteries include a nickel-cadmium secondary battery, a nickel-hydride secondary battery, a lithium-ion secondary battery, etc. The lithium-ion secondary battery has a greater operating voltage and energy density per unit of weight than those of the nickel-cadmium secondary battery and the nickel-hydride secondary battery, and therefore has been widely used as compared to other secondary batteries.

Secondary batteries are classified into a cylindrical battery, a square-shaped battery, and a pouch type battery, based on a shape of a battery case. In the cylindrical and square-shaped battery, an electrode assembly is included inside a cylindrical or square-shaped case. In the pouch type battery, an electrode assembly is included inside a pouch type case.

The electrode assembly is formed by winding an electrode assembly having a stacked structure of a negative sheet, a separator, and a positive sheet. A sealing tape is used to maintain a winding state of the electrode assembly and to protect the electrode assembly. Generally, the sealing tape is wrapped entirely around an outer circumferential surface of the electrode assembly. After wrapping the side surface of the electrode assembly with a side tape, the sealing tape fixes the side tape to the side surface of the electrode assembly through a thermocompression process. An additional lower tape is attached to a lower portion of the electrode assembly to prevent the lower portion of the electrode assembly from being exposed through a thermocompression process.

However, if excessive pressure is applied when attaching the lower tape, a lower portion of the separator is pushed up, and the lower portion of the electrode assembly may be damaged due to an external shock. In addition, if low pressure is applied when attaching the lower tape, the electrode assembly becomes thick due to the lower tape, and interference with a case may occur or the electrode assembly may be damaged when the electrode assembly is inserted into the case.

SUMMARY

Aspects of the present invention provide a structure that can prevent or reduce damage of an electrode assembly due to a shock by reducing the shock applied to a lower portion of the electrode assembly.

Additional aspects of the present invention provide a secondary battery and a manufacturing method of the same that can improve yield by reducing the number of components and simplifying a manufacturing process as well as reducing an external shock.

According to an aspect of the present invention, a secondary battery is provided. The secondary battery includes an electrode assembly having a positive sheet and a negative sheet and a separator interposed between the positive sheet and the negative sheet; a tape to wrap an outer surface of the electrode assembly; and a case to receive the electrode assembly, wherein after a remainder of the tape is formed to extend beyond a lower surface of the electrode assembly and joined by a press, the remainder is positioned between a bottom surface of the case and the lower surface of the electrode assembly.

According to another aspect of the present invention, the remainder comprises an extension of the sealing tape, or comprises an additional protection tape attached to the sealing tape.

According to another aspect of the present invention, a junction portion of the remainder and the lower surface of the electrode assembly are spaced apart from each other to reduce a shock.

According to another aspect of the present invention, after the junction portion of the remainder of the tape is positioned at the center of the lower surface of the electrode assembly, an end of the remainder is bent at least one time, after the junction portion is positioned at one side of the lower surface of the electrode assembly, an end of the remainder is bent toward the center of the lower surface at least one time, or after the junction portion is positioned on one side surface of the electrode assembly, an end of the remainder is bent toward the center of the lower surface at least one time.

According to another aspect of the present invention, a method of manufacturing a secondary battery is provided. The method includes wrapping an outer surface of an electrode assembly with a sealing tape, the electrode assembly having a positive sheet, a negative sheet, and a separator interposed therebetween; forming a remainder by extending the sealing tape beyond a lower surface of the electrode assembly; compressing and joining the remainder via a press; and inserting the electrode assembly into a case such that the joined remainder is disposed between a bottom surface of the case and the lower surface of the electrode assembly.

According to another aspect of the present invention, the forming of the remainder comprises extending the sealing tape, or attaching a protection tape to the sealing tape.

According to another aspect of the present invention, the electrode assembly can have a cylindrical shape or a square shape.

According to aspects of the present invention, when a shock is applied to a lower portion of a secondary battery, the shock can be sufficiently reduced through a space between a bent remainder of a tape outside a lower surface of an electrode assembly and the lower surface of the electrode assembly or the doubly bent remainder of the tape inside a case of the secondary battery, thereby preventing or reducing damage of the electrode assembly due to the external shock.

Further, according to additional aspects of the present invention, it is possible to reduce the number of components and simplify a manufacturing process by omitting an attachment process of a protection tape attached to a lower end of the electrode assembly as well as reducing the external shock, thereby improving yield.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
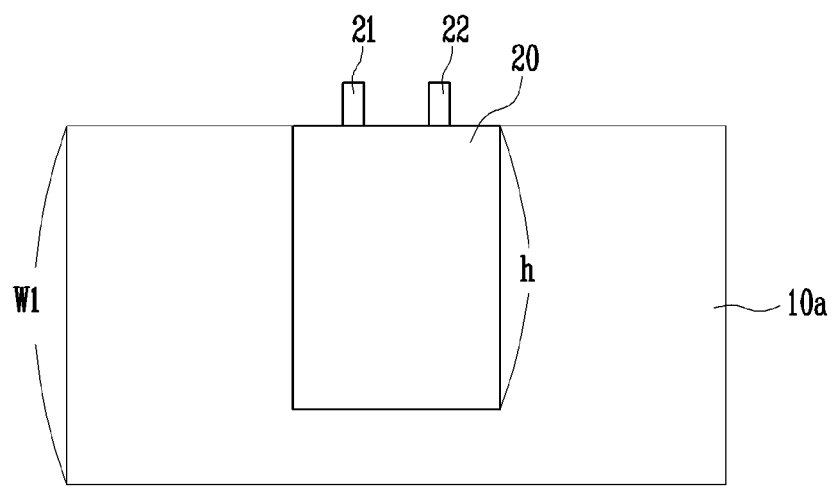
FIGS. 1A and 1C are plane-views showing an electrode assembly employed in a secondary battery before and after attaching a sealing tape, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
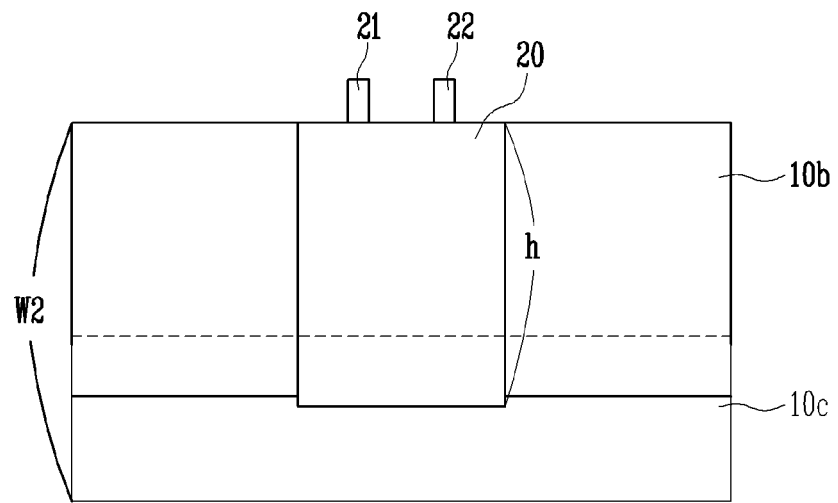
FIGS. 1B and 1D are plane-views showing an electrode assembly employed in a secondary battery before and after attaching a sealing tape, according to another embodiment of the present invention.
Figure 1C:
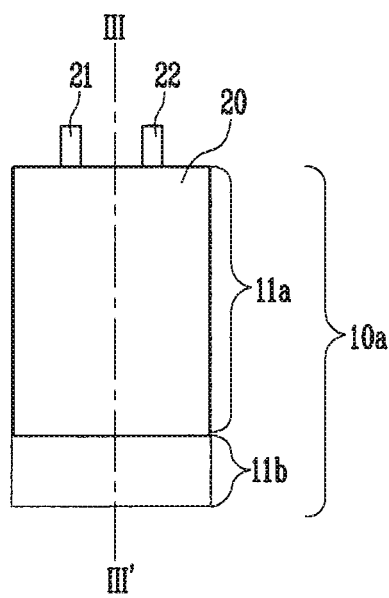
Figure 1D:
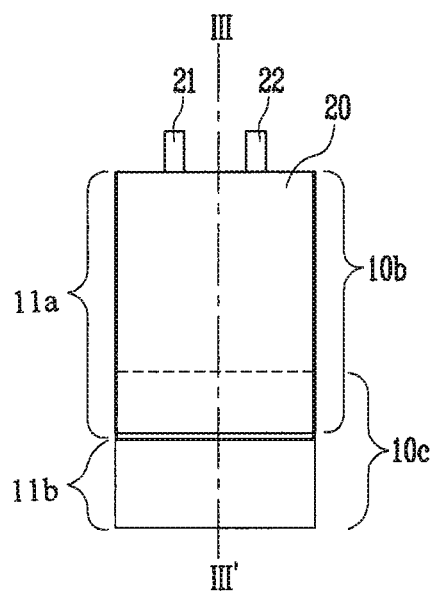

FIGS. 1A and 1C are plane-views showing an electrode assembly employed in a secondary battery before and after attaching a sealing tape according to an embodiment of the present invention. FIGS. 1B and 1D are plane-views showing an electrode assembly employed in a secondary battery according to before and after attaching a sealing tape, according to another embodiment of the present invention.

Referring to FIGS. 1A to 1D, a wound or stacked electrode assembly 20 is wrapped by a sealing tape 10a. The top of the sealing tape 10a is matched with the top of the electrode assembly 20. In the electrode assembly 20, a positive sheet and a negative sheet interposed by a separator are wound and an anode terminal 21 and a cathode terminal 22 are exposed. As shown in FIGS. 1A and 1C, one sealing tape 10a is extended outside a lower surface of the electrode assembly 20 while entirely wrapping an outer surface or an outer circumferential surface of the electrode assembly 20. 11a indicates a first portion where the sealing tape 10a is wrapped around the outer surface or the outer circumferential surface of the wound electrode assembly 20, and 11b indicates a second portion where the sealing tape 10a is extended outside the lower surface of the electrode assembly 20.

According to another aspect of the present invention, as shown in FIGS. 1B and 1D, the sealing tape 10a includes two separate tapes 10b and 10c. The tapes 10a and 10b may be sealing tapes. Alternatively, the tape 10b may be a sealing tape wrapped around an outer surface of an electrode assembly 20, and the tape 10c may be an additional protection tape extended to a lower surface thereof. The protection tape may have a structure or composition different from that of the sealing tape. In other words, the tape extended outside the lower surface of the electrode assembly may be an additional sealing tape made of the same material or another type of protection tape. The connected sealing tape 10a and additional sealing tape, or the connected sealing tape and protection tape may also have a width (W2) longer than a height (h) of the electrode assembly. As shown in FIGS. 1C and 1D, the electrode assemblies 20 are wrapped with the sealing tape 10a and the tapes 10b and/or 10c.

Figure 2A:
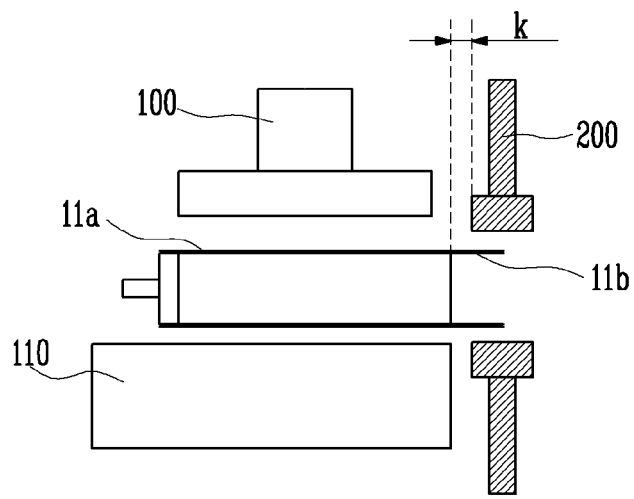
FIGS. 2A and 2B show a process of attaching a sealing tape to a lower portion of an electrode assembly in a secondary battery according to an embodiment of the present invention.
Figure 2B:
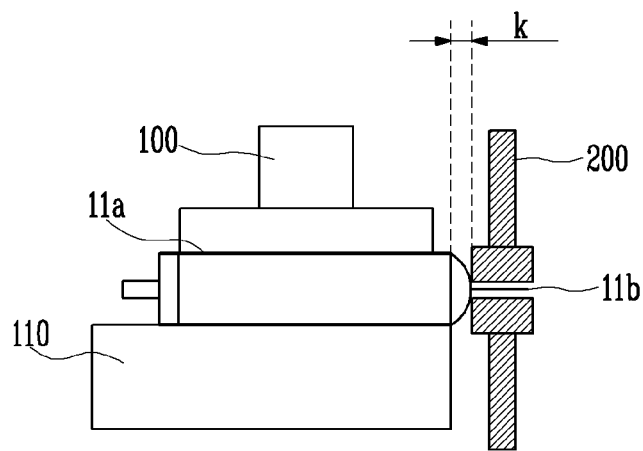
Figure 3A:
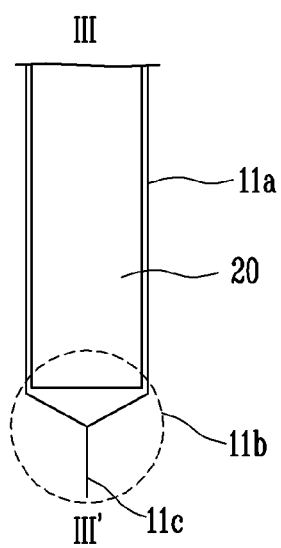
FIGS. 3A and 3B are cross-sectional views showing the electrode assembly shown in FIG. 1C
Figure 3B:
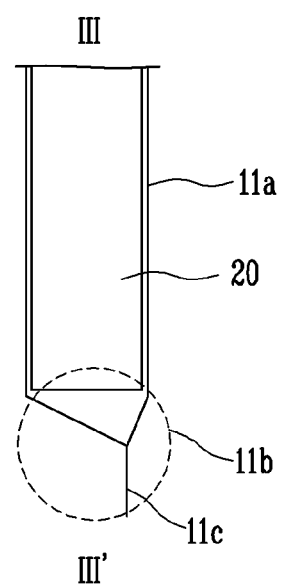
Figure 3C:
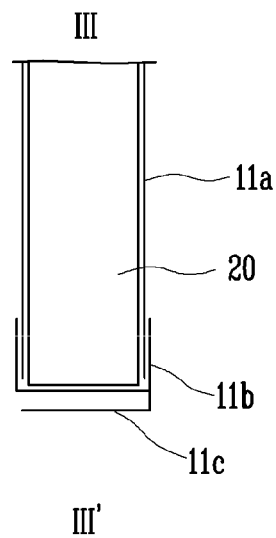
FIG. 3C is a cross-sectional view showing the electrode assembly shown in FIG. 1D.

FIGS. 2A and 2B show a process of attaching a sealing tape to a lower portion of an electrode assembly in a secondary battery according to an embodiment of the present invention. FIGS. 3A and 3B are cross-sectional views showing the electrode assembly before being inserted into a case according to an embodiment of the present invention, and FIG. 3C is a cross-sectional view showing the electrode assembly before being inserted into a case according to another embodiment of the present invention.

As shown in FIGS. 2A and 2B, the sealing tape 10a is fixed to an electrode assembly 20 through a thermocompression process in which heat and pressure are applied to side surfaces of the electrode assembly 20 via a press 100 and a press 200. An upper portion 11a of the sealing tape represents a portion where the sealing tape is attached to an outer surface of the electrode assembly 20 and a lower portion (a remainder) 11b represents a portion where the sealing tape is extended outside a lower surface of the electrode assembly 20.

When performing a thermocompression process on the remainder 11b of the sealing tape, the press 200 is spaced apart from a lower portion of the electrode assembly 20 with a margin of a predetermined distance (k). Because of the predetermined distance (k), the heat is not applied to the lower portion of the electrode assembly 20 in performing the thermocompression process, which protects the lower portion of the electrode assembly 20. Further, when compressing the remainder of the sealing tape in such a manner, a predetermined separated space is formed between a junction portion of the remainder joined to each other and the lower surface of the electrode assembly. This space can play a role of reducing external shocks applied to the electrode assembly.

As shown in the drawings, the upper portion 11a of the sealing tape is fixed to side surfaces of the electrode assembly 20 through the thermocompression process via presses 100 and 110, while the remainder 11b of the sealing tape 10a is joined together by the press 200 to form a junction portion 11c. As shown in FIG. 3A, the junction portion 11c may be positioned at the center of the lower surface of the electrode assembly 20. According to another aspect of the present invention, the junction portion may be positioned at one side of the lower surface of the electrode assembly 20 (as shown in FIG. 3B) and the junction portion 11c may be formed aligned with one side surface of the electrode assembly by operating only one side of the press when joining the sealing tape 10a by the press. According to still another aspect of the present invention, the junction portion 11c is positioned at a point aligned with the one side surface of the electrode assembly 20 as shown in FIG. 3C. These arrangements represent examples of how the junction portion 11c may be disposed; other arrangements may also be provided according to other aspects of the present invention.

The remainder 11b of the sealing tape 10a may be joined by the press and the upper portion 11a of the sealing tape 10a may be thermally compressed by the press at the same time, for convenience of the process. It is also possible to sequentially join the remainder 11b after completing the thermocompression on the outer surface of the electrode assembly. Further, if corners of the remainder 11b are cut at the same time as tape-attachment of the remainder 11b, the junction may be facilitated and the electrode assembly including the joined remainder 11b may be easily inserted into a case (not shown).

FIGS. 3A to 3C are diagrams showing junction types of the remainder 11b outside the lower surface of the electrode assembly through compression of the press 200. The joined remainder 11b is inserted into a case (not shown) after bending the junction portion 11c thereof at least one time. The remainder 11b shown in FIG. 3A is joined at the center of the lower surface of the electrode assembly and a joined end is bent at least one time. The remainder 11b shown in FIG. 3B is joined at one side of the lower surface of the electrode assembly and a joined end is bent toward the center of the lower surface at least one time. The remainder 11b shown in FIG. 3C is joined at a point aligned with the one side surface of the electrode assembly and a joined end is bent toward the center of the lower surface at least one time.

If the remainder 11b is inserted into the case while the junction portion 11c of the remainder 11b is bent, a predetermined space is created between a bottom surface of the case and an end of the junction portion 11c or the lower surface of the electrode assembly and the junction portion 11c. The predetermined space provides a shock-absorbing action that can reduce or prevent damage of the electrode assembly when an external shock is applied, such as when the secondary battery is dropped during use or the like. Further, when the remainder 11b is bent and inserted into the case, the remainder may have a length such that an end of the remainder 11b is not projected outside the case. Alternatively, the length of the case may be designed such that the end of the remainder 11b is not projected outside the case.

Figure 4:
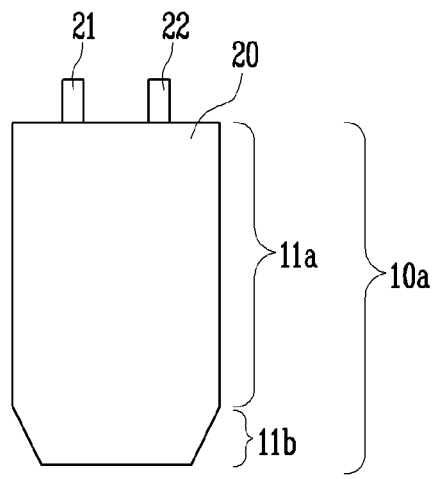
FIG. 4 is a plane-view showing the electrode assembly shown in FIG. 1C during a thermocompression process.

FIG. 4 is a plane-view showing the electrode assembly shown in FIG. 1C when being thermally compressed by the press. As shown in FIG. 4, it is possible to attach the sealing tape after cutting lower corners of the sealing tape during the thermocompression process using the presses 100 and 200. As described above, if the lower corners of the sealing tape are cut, the lower portion of the sealing tape is more smoothly attached.

Figure 5:
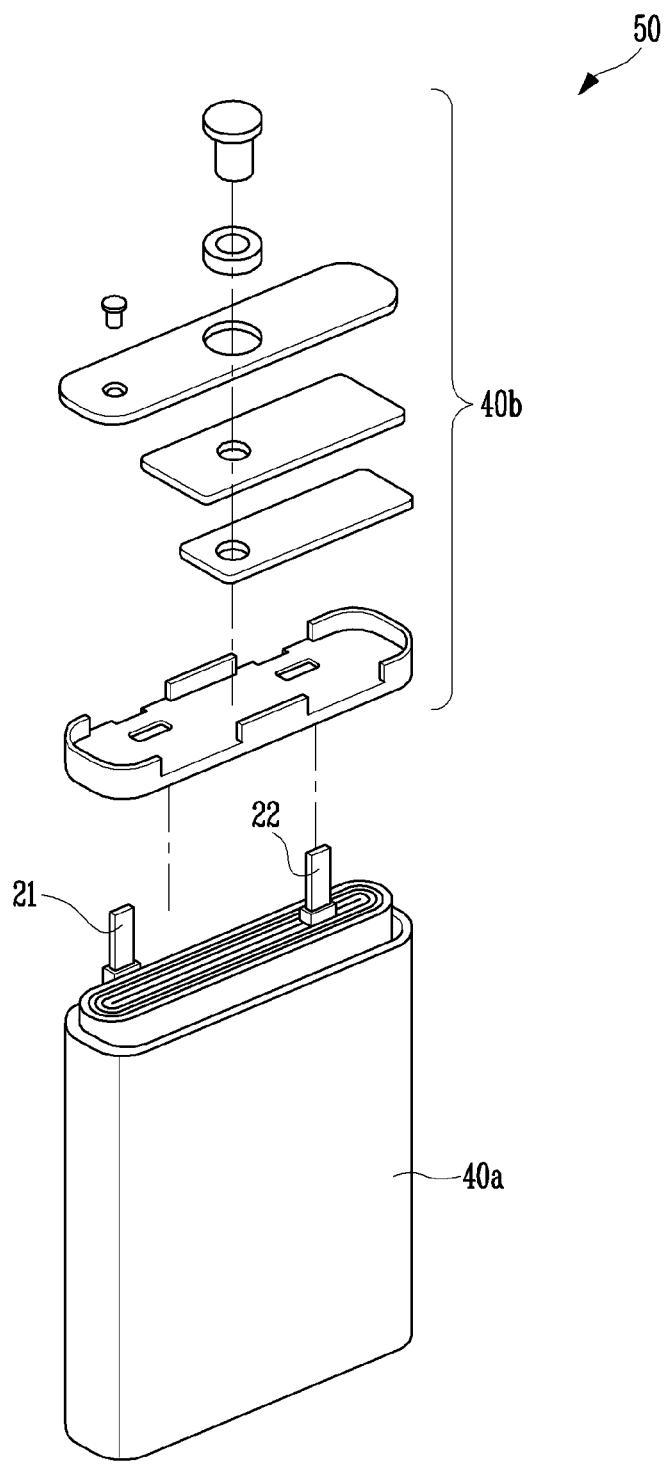
FIG. 5 is an exploded perspective view illustrating a secondary battery according to an embodiment of the present invention.

FIG. 5 is an exploded perspective view showing a secondary battery 50. An attachment process of the electrode assembly according to aspects of the present invention is described with reference to FIG. 5. As shown in FIG. 5, a secondary battery 50 receives the electrode assembly 20 attached with a sealing tape (such as the tapes 10a, 10b, and/or 10c shown in FIGS. 1A-1D) together with an electrolyte in a square-shaped metal case 40a. The top of the case is then sealed by a cap assembly 40b. If the lower portion of the electrode assembly 20 is not sealed by a protection tape when receiving the electrode assembly 20 in the metal case 40a, the electrode assembly may be damaged. According to aspects of the present invention, after a remainder 11b is formed outside a lower surface of the electrode assembly and is compressed together by the press, the remainder 11b is bent toward the center of the lower surface of the electrode assembly and inserted into the case.

According to another aspect of the present invention, after the remainder 11b is formed by extending the sealing tape to the outside of the lower surface of the electrode assembly and joined together by the press to form a junction portion, the junction portion is bent toward the center of the lower surface of the electrode assembly and inserted into the case.

As a result, after the remainder is first formed by extending the tape to the outside of the lower surface of the electrode assembly irrespective of the use of the sealing tape or the protection tape and is joined together by the press, if the end of the junction portion is bent toward the center of the lower surface of the electrode assembly again, a separated space formed at a lower portion of the electrode assembly plays a role of a shock-absorbing space and the junction portion of the remainder of the tape is at least doubly formed at the lower portion of the electrode assembly to prevent damage to the lower portion of the electrode assembly. Although a square-shaped secondary battery is shown in FIG. 5, the shape of the secondary battery is not limited thereto, and aspects of the present invention may be applied to a cylindrical secondary battery or other type of secondary battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
an electrode assembly including a positive sheet and a negative sheet and a separator interposed between the positive sheet and the negative sheet;
a sealing tape to wrap an outer surface of the electrode assembly; and
a case to receive the electrode assembly,
wherein, after a remainder of the tape is formed to extend beyond a lower surface of the electrode assembly and joined by a press to form a junction portion of the remainder, the remainder is positioned between a bottom surface of the case and the lower surface of the electrode assembly, and a separated space is formed between the junction portion of the remainder joined to each other and the lower surface of the electrode assembly.

2. The secondary battery of claim 1, wherein the remainder comprises an extension of the tape.

3. The secondary battery of claim 1, wherein the remainder comprises an additional protection tape attached to the tape.

4. A secondary battery comprising:
an electrode assembly including a positive sheet and a negative sheet and a separator interposed between the positive sheet and the negative sheet;
a sealing tape wrapping an outer surface of the electrode assembly and including a remainder extending beyond a lower surface of the electrode assembly; and
a case to receive the electrode assembly,
wherein inner surfaces of portions of the remainder extending outside opposite sides of the lower surface of the electrode assembly are joined to each other to form a junction portion of the remainder, and
wherein the joined remainder is bent at least one time and positioned between a bottom surface of the case and the lower surface of the electrode assembly.

5. The secondary battery of claim 1, wherein the joined remainder is positioned at one side of the lower surface of the electrode assembly and bent toward the center of the lower surface at least one time.

6. The secondary battery of claim 1, wherein the joined remainder is positioned on one side surface of the electrode assembly and bent toward the center of the lower surface at least one time.

7. The secondary battery according to claim 4, wherein the remainder has a length such that an end of the remainder does not project outside the case.

8. The secondary battery of claim 1, wherein the case is in a cylindrical shape.

9. The secondary battery of claim 1, wherein the case is in a square shape.

10. A method of manufacturing a secondary battery, comprising:
- wrapping an outer surface of an electrode assembly with a sealing tape, the electrode assembly including a positive sheet, a negative sheet, and a separator interposed therebetween;
- forming a remainder by extending the tape beyond a lower surface of the electrode assembly;
- compressing and joining the remainder via a press to form a junction portion of the remainder; and
- inserting the electrode assembly into a case such that the joined remainder is disposed between a bottom surface of the case and the lower surface of the electrode assembly, and a separated space is formed between the junction portion of the remainder joined to each other and the lower surface of the electrode assembly.

11. The manufacturing method of claim 10, wherein the forming of the remainder comprises extending the tape.

12. The manufacturing method of claim 10, wherein the forming of the remainder comprises attaching a protection tape to the tape.

13. The manufacturing method of claim 10, wherein the remainder is joined at the center of the lower surface of the electrode assembly and bent at least one time.

14. The manufacturing method of claim 10, wherein the remainder is joined at one side of the lower surface of the electrode assembly and bent toward the center of the lower surface at least one time.

15. The manufacturing method of claim 10, wherein the remainder is joined at a point aligned with one side surface of the electrode assembly and bent toward the center of the lower surface at least one time.

16. The manufacturing method of claim 13, wherein the remainder has a length such that an end of the remainder does not project outside the case.

17. The manufacturing method of claim 10, wherein corners of the tape are cut while the tape is joined by the press.

18. The manufacturing method of claim 10, wherein the joining of the remainder corresponds to thermocompression by the press.

19. The secondary battery of claim 1, wherein inner surfaces of portions of the remainder extending outside opposite sides of the lower surface of the electrode assembly are joined to each other to form the junction portion of the remainder.

20. The manufacturing method of claim 10, wherein inner surfaces of portions of the remainder extending outside opposite sides of the lower surface of the electrode assembly are joined to each other to form the junction portion of the remainder.

* * * * *